US008161412B2

(12) United States Patent
Weeks et al.

(10) Patent No.: US 8,161,412 B2
(45) Date of Patent: Apr. 17, 2012

(54) SYSTEMS, METHODS, AND COMPUTER PROGRAM PRODUCTS FOR PROVIDING INTERACTIVE CONTENT

(75) Inventors: Phillip Weeks, Atlanta, GA (US); John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 156 days.

(21) Appl. No.: 11/332,685

(22) Filed: Jan. 13, 2006

(65) Prior Publication Data

US 2007/0168884 A1 Jul. 19, 2007

(51) Int. Cl.
*G06F 3/14* (2006.01)
*G06F 3/17* (2006.01)
(52) U.S. Cl. ............ 715/854; 715/717; 725/35; 725/38; 725/40; 725/42; 725/46; 725/54; 725/60; 709/223; 348/461; 380/211
(58) Field of Classification Search .......... 715/200–277, 715/700–867; 705/50–79; 709/201–229
See application file for complete search history.

(56) References Cited

U.S. PATENT DOCUMENTS

| 3,798,610 A | 3/1974 | Bliss et al. ................ 709/236 |
| 3,886,302 A | 5/1975 | Kosco ........................ 380/211 |
| 4,130,833 A | 12/1978 | Chomet ..................... 380/220 |
| 4,258,386 A | 3/1981 | Cheung ........................ 725/14 |
| 4,264,925 A | 4/1981 | Freeman et al. ............ 725/138 |
| 4,361,851 A | 11/1982 | Asip et al. .................... 725/14 |
| 4,488,179 A | 12/1984 | Kruger et al. ............... 348/706 |
| 4,566,030 A | 1/1986 | Nickerson et al. ......... 379/92.04 |
| 4,567,591 A | 1/1986 | Gray et al. .................... 370/326 |
| 4,573,072 A | 2/1986 | Freeman .................... 725/136 |
| 4,598,288 A | 7/1986 | Yarbrough et al. .......... 340/5.74 |
| 4,688,248 A * | 8/1987 | Tomizawa .................. 380/211 |
| 4,689,661 A | 8/1987 | Barbieri et al. .......... 375/240.01 |
| 4,698,670 A | 10/1987 | Matty ......................... 725/131 |
| 4,720,873 A | 1/1988 | Goodman et al. .............. 725/32 |
| 4,816,904 A | 3/1989 | McKenna et al. ............. 725/11 |
| 4,862,268 A | 8/1989 | Campbell et al. |
| 4,890,322 A | 12/1989 | Russell, Jr. ................. 380/231 |
| 4,912,552 A | 3/1990 | Allison, III et al. ........... 725/21 |
| 5,010,585 A | 4/1991 | Garcia ........................ 455/118 |
| 5,038,211 A | 8/1991 | Hallenbeck ................. 348/460 |

(Continued)

FOREIGN PATENT DOCUMENTS

WO WO 94/14284 6/1994

OTHER PUBLICATIONS

Zap2it.com: "TV Listings Frequently Asked Questions", http://web.archive.org/web/20000903002526/www.zap2it.com/index/1,1146,4_I_0_000,FF.html.

(Continued)

*Primary Examiner* — Ruay Ho
(74) *Attorney, Agent, or Firm* — Toler Law Group, PC

(57) ABSTRACT

Exemplary embodiments include a system for providing interactive content including: an input for receiving a hot key signal related to interactive content, the hot key signal indicative of an availability and a location of an alternate content; and a processor which indicates that the hot key signal has been received, and responsive to receiving an indication that the hot key is accepted, redirects a user to the alternate content, wherein the alternate content is an interactive user interface related to the interactive content.

15 Claims, 3 Drawing Sheets

U.S. PATENT DOCUMENTS

| | | |
|---|---|---|
| 5,046,090 A | 9/1991 | Walker et al. ............... 380/202 |
| 5,046,092 A | 9/1991 | Walker et al. ............... 380/239 |
| 5,055,924 A | 10/1991 | Skutta ........................... 725/34 |
| 5,161,019 A | 11/1992 | Emanuel |
| 5,173,900 A | 12/1992 | Miller et al. ................. 370/349 |
| 5,181,438 A | 1/1993 | Wellman |
| 5,191,645 A | 3/1993 | Carlucci et al. .............. 715/723 |
| 5,208,665 A | 5/1993 | McCalley et al. ............ 725/119 |
| 5,247,347 A | 9/1993 | Litteral et al. ................ 725/114 |
| 5,249,044 A | 9/1993 | Von Kohorn .................. 725/23 |
| 5,260,778 A | 11/1993 | Kauffman et al. |
| 5,262,860 A * | 11/1993 | Fitzpatrick et al. ........... 348/461 |
| 5,287,181 A | 2/1994 | Holman ......................... 725/20 |
| 5,335,277 A | 8/1994 | Harvey et al. ................. 348/734 |
| 5,339,315 A | 8/1994 | Maeda et al. .................. 725/131 |
| 5,343,240 A | 8/1994 | Yu ................................... 725/120 |
| 5,357,276 A * | 10/1994 | Banker et al. ................. 725/102 |
| 5,374,951 A | 12/1994 | Welsh ............................ 725/20 |
| 5,390,027 A | 2/1995 | Henmi et al. .................. 386/65 |
| 5,404,393 A | 4/1995 | Remillard ................... 379/93.25 |
| 5,444,499 A | 8/1995 | Saitoh ............................ 348/734 |
| 5,446,490 A | 8/1995 | Blahut et al. .................. 725/97 |
| 5,446,919 A | 8/1995 | Wilkins |
| 5,481,542 A | 1/1996 | Logston et al. ............... 725/131 |
| 5,483,277 A | 1/1996 | Granger ......................... 725/120 |
| 5,502,499 A | 3/1996 | Birch et al. |
| 5,539,451 A | 7/1996 | Carey et al. |
| 5,539,822 A | 7/1996 | Lett |
| 5,541,917 A | 7/1996 | Farris |
| 5,555,838 A | 9/1996 | Bergman |
| 5,557,320 A | 9/1996 | Krebs |
| 5,557,338 A * | 9/1996 | Maze et al. .................... 725/38 |
| 5,585,838 A * | 12/1996 | Lawler et al. ................. 725/54 |
| 5,585,858 A | 12/1996 | Harper et al. |
| 5,592,477 A | 1/1997 | Farris et al. |
| 5,600,775 A | 2/1997 | King et al. |
| 5,608,448 A | 3/1997 | Smoral et al. ................. 725/92 |
| 5,629,733 A | 5/1997 | Youman et al. |
| 5,640,192 A | 6/1997 | Garfinkle ....................... 725/116 |
| 5,648,824 A | 7/1997 | Dunn et al. .................... 725/88 |
| 5,661,517 A | 8/1997 | Budow et al. |
| 5,721,829 A | 2/1998 | Dunn et al. .................... 725/87 |
| 5,779,549 A | 7/1998 | Walker et al. |
| 5,781,246 A * | 7/1998 | Alten et al. .................... 725/40 |
| 5,796,426 A | 8/1998 | Gullichsen et al. |
| 5,805,154 A * | 9/1998 | Brown ........................... 715/717 |
| 5,818,438 A | 10/1998 | Howe et al. .................... 715/718 |
| 5,822,123 A | 10/1998 | Davis et al. .................... 725/43 |
| 5,828,420 A | 10/1998 | Marshall et al. ............... 725/47 |
| 5,847,771 A | 12/1998 | Cloutier et al. ................ 348/564 |
| 5,864,823 A | 1/1999 | Levitan |
| 5,867,205 A | 2/1999 | Harrison ........................ 725/38 |
| 5,880,768 A | 3/1999 | Lemmons et al. |
| 5,880,769 A | 3/1999 | Nemirofsky et al. ......... 725/139 |
| 5,892,508 A | 4/1999 | Howe et al. .................... 725/131 |
| 5,931,908 A | 8/1999 | Gerba et al. .................... 709/219 |
| 5,977,964 A | 11/1999 | Williams et al. |
| 5,990,927 A | 11/1999 | Hendricks |
| 6,005,561 A | 12/1999 | Hawkins et al. |
| 6,008,802 A | 12/1999 | Iki et al. |
| 6,012,983 A | 1/2000 | Walker et al. |
| 6,018,764 A | 1/2000 | Field et al. |
| 6,025,837 A | 2/2000 | Matthews, III et al. |
| 6,100,883 A | 8/2000 | Hoarty ........................... 715/721 |
| 6,108,042 A | 8/2000 | Adams et al. .................. 348/460 |
| 6,113,495 A | 9/2000 | Walker et al. |
| 6,157,413 A | 12/2000 | Hanafee et al. |
| 6,201,536 B1 | 3/2001 | Hendricks et al. |
| 6,213,880 B1 | 4/2001 | Sim |
| 6,230,172 B1 | 5/2001 | Purnaveja et al. |
| 6,240,555 B1 | 5/2001 | Shoff et al. |
| 6,244,957 B1 | 6/2001 | Walker et al. |
| 6,256,785 B1 | 7/2001 | Klappert et al. ............... 725/136 |
| 6,317,885 B1 | 11/2001 | Fries |
| 6,324,544 B1 | 11/2001 | Alam et al. |
| 6,324,694 B1 | 11/2001 | Watts et al. |
| 6,327,574 B1 | 12/2001 | Kramer et al. |
| 6,357,042 B2 | 3/2002 | Srinivasan et al. |
| 6,363,525 B1 * | 3/2002 | Dougherty et al. ............ 725/34 |
| 6,418,556 B1 | 7/2002 | Bennington et al. |
| 6,419,137 B1 | 7/2002 | Marshall et al. ............... 225/41 |
| 6,463,207 B1 | 10/2002 | Abecassis ...................... 386/70 |
| 6,463,585 B1 | 10/2002 | Hendricks et al. |
| 6,468,155 B1 | 10/2002 | Zucker et al. |
| 6,477,579 B1 | 11/2002 | Kunkel et al. |
| 6,502,242 B1 | 12/2002 | Howe et al. .................... 725/109 |
| 6,535,889 B1 | 3/2003 | Headrick et al. |
| 6,557,006 B1 | 4/2003 | Headrick et al. |
| 6,567,982 B1 | 5/2003 | Howe |
| 6,615,408 B1 | 9/2003 | Kaiser et al. |
| 6,634,942 B2 | 10/2003 | Walker |
| 6,676,522 B2 | 1/2004 | Rowe |
| 6,704,930 B1 * | 3/2004 | Eldering et al. ............... 725/36 |
| 6,718,551 B1 | 4/2004 | Swix |
| 6,738,978 B1 | 5/2004 | Hendricks et al. |
| 6,756,997 B1 | 6/2004 | Ward |
| 6,760,916 B2 | 7/2004 | Holtz |
| 6,800,029 B2 | 10/2004 | Rowe |
| 6,826,775 B1 | 11/2004 | Howe |
| 6,850,252 B1 | 2/2005 | Hoffberg |
| 6,898,762 B2 | 5/2005 | Ellis |
| 6,967,566 B2 | 11/2005 | Weston |
| 7,100,183 B2 | 8/2006 | Kunkel et al. .................. 725/34 |
| 7,237,253 B1 | 6/2007 | Blackketter |
| 7,249,321 B2 * | 7/2007 | Bushey et al. ................ 715/747 |
| 7,266,835 B2 * | 9/2007 | Halbert .......................... 725/60 |
| 7,337,457 B2 | 2/2008 | Pack |
| 2001/0016943 A1 * | 8/2001 | Maas et al. ..................... 725/36 |
| 2001/0054134 A1 | 12/2001 | Nagatomo et al. |
| 2002/0056093 A1 | 5/2002 | Kunkel et al. |
| 2002/0069132 A1 | 6/2002 | Perkes et al. |
| 2002/0083464 A1 | 6/2002 | Tomsen et al. |
| 2002/0083469 A1 | 6/2002 | Jeannin et al. |
| 2002/0087402 A1 | 7/2002 | Zustak et al. |
| 2002/0138561 A1 | 9/2002 | Chatfield et al. .............. 709/203 |
| 2002/0147984 A1 | 10/2002 | Thomsen |
| 2002/0147988 A1 | 10/2002 | Nakano ......................... 725/134 |
| 2002/0156870 A1 * | 10/2002 | Boroumand et al. .......... 709/219 |
| 2003/0018969 A1 | 1/2003 | Humpleman |
| 2003/0037332 A1 * | 2/2003 | Chapin et al. .................. 725/35 |
| 2003/0067554 A1 | 4/2003 | Klarfeld |
| 2003/0070167 A1 | 4/2003 | Holtz |
| 2003/0110171 A1 | 6/2003 | Ozer |
| 2003/0110499 A1 | 6/2003 | Knudson |
| 2003/0117445 A1 | 6/2003 | Hendricks |
| 2003/0145323 A1 | 7/2003 | Hendricks |
| 2003/0149975 A1 | 8/2003 | Eldering |
| 2003/0163828 A1 | 8/2003 | Agnihotri |
| 2003/0182567 A1 | 9/2003 | Barton |
| 2003/0188317 A1 * | 10/2003 | Liew et al. ..................... 725/88 |
| 2003/0204847 A1 | 10/2003 | Ellis et al. ...................... 725/42 |
| 2003/0208754 A1 | 11/2003 | Sridhar |
| 2003/0233656 A1 | 12/2003 | Sie |
| 2003/0235407 A1 | 12/2003 | Lord |
| 2004/0003402 A1 * | 1/2004 | McKenna, Jr. ................. 725/46 |
| 2004/0006509 A1 | 1/2004 | Mannik |
| 2004/0045028 A1 | 3/2004 | Harris |
| 2004/0049785 A1 | 3/2004 | Grzeczkowski et al. ....... 725/46 |
| 2004/0098754 A1 | 5/2004 | Vella |
| 2004/0103032 A1 | 5/2004 | Maggio |
| 2004/0117819 A1 * | 6/2004 | Yu .................................. 725/32 |
| 2004/0122731 A1 | 6/2004 | Mannik |
| 2004/0163101 A1 | 8/2004 | Swix |
| 2004/0168188 A1 | 8/2004 | Bennington et al. ........... 725/41 |
| 2004/0194138 A1 | 9/2004 | Boylan |
| 2004/0220858 A1 | 11/2004 | Maggio |
| 2004/0235567 A1 | 11/2004 | Chatani |
| 2004/0243470 A1 | 12/2004 | Ozer |
| 2004/0243623 A1 | 12/2004 | Ozer |
| 2004/0261127 A1 | 12/2004 | Freeman et al. ............... 725/135 |
| 2004/0268418 A1 | 12/2004 | Gray et al. |
| 2005/0021403 A1 | 1/2005 | Ozer |
| 2005/0086688 A1 | 4/2005 | Omoigui ........................ 725/35 |
| 2005/0091111 A1 | 4/2005 | Green |
| 2005/0097599 A1 | 5/2005 | Plotnick |
| 2005/0108776 A1 | 5/2005 | Carver |
| 2005/0114906 A1 | 5/2005 | Hoarty et al. .................. 725/135 |

| | | | |
|---|---|---|---|
| 2005/0196139 A1 | 9/2005 | Blackketter et al. | 386/46 |
| 2005/0204030 A1* | 9/2005 | Koch et al. | 709/223 |
| 2005/0204385 A1 | 9/2005 | Sull | |
| 2005/0216932 A1 | 9/2005 | Danker | |
| 2005/0235318 A1 | 10/2005 | Grauch | |
| 2005/0251820 A1 | 11/2005 | Stefanik | |
| 2005/0262542 A1 | 11/2005 | DeWeese | |
| 2005/0267809 A1 | 12/2005 | Zheng | |
| 2005/0267810 A1 | 12/2005 | Zheng | |
| 2005/0267820 A1 | 12/2005 | Zheng | |
| 2006/0010476 A1 | 1/2006 | Kelly | |
| 2006/0053049 A1 | 3/2006 | Nolan | |
| 2006/0075430 A1* | 4/2006 | Park | 725/42 |
| 2006/0087987 A1 | 4/2006 | Witt | |
| 2006/0190966 A1 | 8/2006 | McKissick et al. | 725/61 |
| 2006/0200842 A1 | 9/2006 | Chapman et al. | |
| 2007/0067805 A1 | 3/2007 | Macrae et al. | |
| 2007/0107035 A1 | 5/2007 | Howe et al. | |
| 2007/0124763 A1* | 5/2007 | Ellis | 725/35 |
| 2007/0136773 A1 | 6/2007 | O'Neil | |
| 2007/0155506 A1 | 7/2007 | Malik | |
| 2007/0157235 A1 | 7/2007 | Teunissen | |
| 2007/0168884 A1 | 7/2007 | Weeks | |
| 2007/0186269 A1 | 8/2007 | Malik | |
| 2007/0208766 A1 | 9/2007 | Malik | |

OTHER PUBLICATIONS

"WorldGate set to deliver 'Go!TV Links' for dynamic interactive TV." Advanstar Communications, Inc.: Oct. 22, 2002.

"Next-generation digital video network: intelligent IP infrastructure solutions for cable operators offering VoD Services." Reed Business Information: Feb. 2004.

Lin, Carolyn A Atkin, David J Abelman and Robert. "The influence of network branding on audience affinity for network television." Advertising Research Foundation: May 2002.

"Video on the move." Reed Business Information: Aug. 14, 2000.

"Building the perfect on demand beast: television on demand presents a dizzyling array of technology options." Reed Business Information: Nov. 3, 2003.

"Successfully marketing television on demand: operators, programmers look to drive VOD usage through promotions, improved navigation." Reed Business information: Nov. 22, 2004. ISSN: 0276-8593.

"Building a Switched Broadcast Network." Access Intelligence LLC: Nov. 15, 2005.

Leban M. "Internet search for TV content based on TV Anytime." Ljubljana, Slovenia: Sep. 22-24, 2003.

"Chips: Motorola's Scorpion chip turns TV into interactive information appliance." Work Group Computing Report: Aug. 11, 1997.

"Set-top Survival." Electronics Weekly: May 22, 2002.

Peter Grant. "On-Demand TV Expands via Underused Fiber Highways." Wall Street Journal: Dec. 17, 2004.

Diane Mermigas. "Nbc taking TVs future by the reins with on-demand content, delivery." Television Week: Sep. 15, 2003.

"Liberate Technologies Completes Assessment Aboard Scientific-Atlanta Explorer Set_Tops and Digital Interactive Network." Liberate Technologies Press: May 2, 2002.

"EnReach Technology, Inc. Demonstrates Next Generation of Interactive Television with Innovative Open PVR solution." EnReach Technology, Inc. PRNewswire: Sep. 12, (1996-2006).

"PBS Debuts Another First in Interactive Television; Wavexpress Selected to Provide Digital Broadcasting Platform." Market Wire: Feb. 28, 2001.

"PENTV: BBC achieves significant interactive TV audiences with OpenTV." Aug. 13, 2001.

Jan L.M. Verhoeven, Peter H.N. de With and Wim J.C.M. Bus. "System architecture for experimental interactive television." LogicaCMG Nederland B.V.

"Building Dynamic Content for Set-Top Boxes." Sun Microsystems (1994-2005).

"Columbia Tri-Star Television Distribution and Microsoft Sponsor Development Competition for Interactive Television." Microsoft PressPass: Jan. 25, 2000.

Christpoher Keough. "Interactive Tv connection-Technology-Gold Pocket Interactive Acquires Mixed Signals Technologies." Los Angeles Business Journal: Mar. 4, 2002.

John Carey. "Content and Services for the New Digital TV Environment.".

US 5,787,683, 7/1998, Sistanizadeh et al. (withdrawn).

Peter M. Zollman. "Interactive Television."

Ben Berkowitz. "Developers interacting with Sony set-top box." Cable World: May 21, 2001.

Winston W. Hodge. "Architecture to deliver video on demand." Electronic Business Buyer: Nov. 1994.

Olsen and Shim, "TiVo looks to tune in to advertisers." CNET News, Mar. 23, 2004, 3 pages.

"Video on the move." Reed Business Information: Aug. 14, 2000.

"Building the perfect on demand beast: television on demand presents a dizzyling array of technology options." Reed Business Information: Nov. 3, 2003.

"Successfully marketing television on demand: operators, programmers look to drive VOD usage through promotions, improved navigation." Reed Business information: Nov. 22, 2004. ISSN: 0276-8593.

Diane Mermigas. "NBC taking TV's future by the reins with on-demand content, delivery." Television Week: Sep. 15, 2003.

Jan L.M. Verhoeven, Peter H.N. de With and Wim J.C.M. Bus. "System architecture for experimental interactive television." LogicaCMG Nederland B.V., Dec. 2001.

US 5,787,683, Jul. 1998, Sistanizadeh et al. (withdrawn).

Peter M. Zollman. "Interactive Television," Jan. 6, 2006.

David Short. "A quick guide to interactive television." Broadcasting Engineering: Feb. 2005.

"Time Warner introduces world's first full service network in Orlando; Network offers First Digital Interactive Service including Movies on Demand, Home Shopping and Interactive Games." Dec. 14, 1994.

David Waterman. "Internet TV: Business Models and Program Content." Dept. of Telecommunications Radio and TV Center: Sep. 2001.

Sanjay Kumar Jain and R.S. Jadon. "Video on Demand: An Overview." Jamia Millia Islamia (A Central University): Feb. 2003.

R.A Bissell and A Eales. "The set-top box for interactive services." BT Technol J vol. 13 No. 4: Oct. 1995.

Konstantinos Chorianopoulos. "The Digital Set-Top Box as a Virtual Channel Provider." Dept. of Management Science and Technology, Athens University of Economics & Business: Apr. 2003.

Henning Dransfeld, Gabriel Jacobs and William Dowsland. "Interactive TV and Formula One: a strategic issue for engine suppliers." European Business Review: (1999).

H.O. Srivastava and R.C. Jain. "On-line Broadcast archives for Interactive Video." (1997).

J.L. Droitcourt "Understanding How Interactive Television Set Top Box Works . . . and What it Will Mean to the Customer." International Broadcasting Convention: Sep. 14-18, 1995.

"Enter Video-On-Demand." Electronic News: Aug. 31, 1998.

Lydia Loizides. "Interactive TV: Dispelling Misconceptions in the Media." Acm Computers in Entertainment, vol. 3, No. 1, Jan. 2005, Article 7a.

"Successfully marketing television on demand: operators, programmers look to drive VOD usage through promotions, improved navigation." Reed Business information: Nov. 22, 2004. ISSN: 0007-2028.

Interactive Television; Peter M. Zollman; www.rtnda.org/resources/intnews/srttv.htm; pp. 1-8, Apr. 24, 2006.

Time Warner introduces world's first full service network in Orlando; Network offers First Digital Interactive Services Including Movies on Demand, Home Shopping and Interactive Games; Business Wire; Dec. 14, 1994; pp. 1-3.

Play . . . Fast Forward . . . Rewind . . . Pause U.S. Firms Want to Wire America for Two-Way Tv, But Their Systems Are Not Yet Ready for Prime Time; Philip Elmer-Dewitt; Time Archive; May 23, 1994; pp. 1-4.

Ready for Prime Time?; Philip Elmer-Dewitt; Time Archive; Dec. 26, 1994; pp. 1-3.

Battle for Remote Control; John Greenwald; Time Archive; Mar. 1, 1995; pp. 1-4.

The set-top box for interactive devices; R.A. Bissell and A. Eales; BT Technology J. vol. 13, No. 4, Oct. 1995; pp. 66-77.

Knightrider TV Intro Theme, IMDb.com, Inc., 1982

Zap2it.com: "TV Listings Frequently Asked Questions", http://web.archive.org/web/20000903002526/www.zap2it.com/index/1,1146,4_I_0_000,FF.;html, Dec. 1, 2000.

* cited by examiner

SYSTEMS, METHODS, AND COMPUTER PROGRAM PRODUCTS FOR PROVIDING INTERACTIVE CONTENT

BACKGROUND

Advances in telecommunications and computing technology have led to the use of interactive television (TV) services on a large scale. Where such services are available, users are not only able to access television content by passively receiving it, but are also beginning to interact with the service providers by communicating requests and/or commands to the service providers. These requests and/or commands may be communicated to the service provider via the same path over which the programming services are provided or even via other paths.

Interactive television may be provided over any number of paths, including coaxial cable or optical fiber, hybrid fiber/coaxial, or any other suitable path that accommodates sufficient bandwidth for desired video channels as well as other communication services. Content providers may include, for example, providers of over-the-air programming such as commercial television stations, cable programming such as weather, travel and entertainment channels, game channels, and other interactive services of various types.

Generally, TV service provides a user or users with a variety of options such as: traditional broadcast and cable television programming; video services, such as pay-per-view (PPV), near video-on-demand (NVOD), video-on-demand (VOD), promo channels, electronic program guides, etc.; cable delivered PC-based services; and interactive services through the use of a combination of compression and digital video technologies. TV services may also provide menuing capabilities and upstream signaling from users to service providers.

The combination of broadcast and interactive applications over interactive TV (e.g., interactive content) creates a possible mode of communication in which a user, if informed of the availability of alternate interactive content relating to a subject matter of interest, may invoke the alternate content to investigate that subject matter more thoroughly and according to his or her own tastes. However, television viewers, who are accustomed to choosing at will between the available transmitted channels with instantaneous results, will expect to be informed of the alternate content in a convenient and timely manner and to pass from one medium to another seamlessly.

SUMMARY

Exemplary embodiments include a system for providing interactive content including: an input for receiving a hot key signal related to interactive content, the hot key signal indicative of an availability and a location of an alternate content; and a processor which indicates that the hot key signal has been received, and responsive to receiving an indication that the hot key is accepted, redirects a user to the alternate content, wherein the alternate content is an interactive user interface related to the interactive content.

Exemplary embodiments also include a method for providing interactive content including: transmitting a primary content; transmitting a hot key signal related to the primary content, the hot key signal indicative of an availability and a location of an alternate content; receiving a request for the alternate content; and transmitting the alternate content, wherein the alternate content is an interactive user interface related to the primary content.

Exemplary embodiments further include a computer program product providing interactive content, the computer program product including: a storage medium readable by a processing circuit and storing instructions for execution by the processing circuit for facilitating a method including: transmitting a primary content; transmitting a hot key signal related to the primary content, the hot key signal indicative of an availability and a location of an alternate content; receiving a request for the alternate content; and transmitting the alternate content, wherein the alternate content is an interactive user interface related to the primary content.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several Figures.

DETAILED DESCRIPTION

Disclosed herein is a system for providing interactive content. The description that follows is directed to interactive advertisements. However, it should be appreciated that the invention is not limited to providing interactive advertisements but may be applicable to any interactive content.

According to one embodiment, a system for providing interactive advertisements includes: a receiver that receives a hot key signal related to an advertisement, the hot key signal is indicative of an availability and a location of an alternate content; a processor that displays an on-screen an indicator that the hot key signal has been received, and responsive to receiving an indication that the hot key is accepted, redirects a user to the alternate content; and wherein the alternate content is an interactive user interface related to the advertisement.

Referring now to the Figures for the purpose of illustrating exemplary embodiments and not for the purpose of limiting the same, it is to be understood that standard components or features that are within the purview of an artisan of ordinary skill and do not contribute to the understanding of the various embodiments of the invention are omitted from the Figures to enhance clarity.

FIGS. 1A-1D illustrate a display of a picture on, e.g., a television screen. The picture contains a hot key for informing a user of available alternate content and redirecting the user to the alternate content responsive to selection of the hot key according to one embodiment of the present invention. These figures represent respectively a process of viewing content, receiving a hot key, accepting a hot key, and redirecting to alternate content.

Figure 1A:
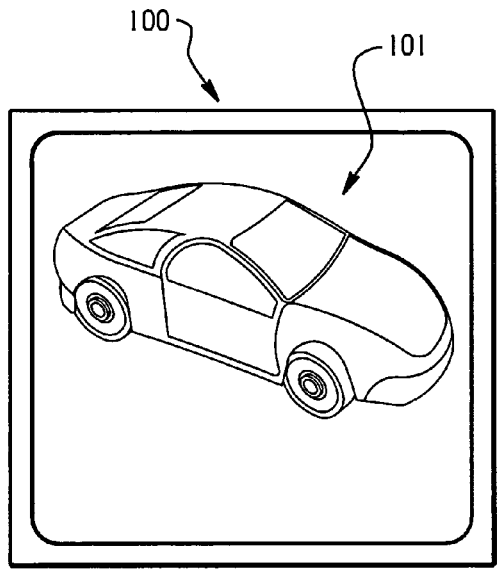
FIGS. 1A-1D illustrate a display of a picture containing a hot key for informing a user of available alternate content in exemplary embodiments.

FIG. 1A illustrates an example of viewing a primary content 101. In FIG. 1A the primary content 101 is depicted as a video program and is being displayed on a display 100, shown as a traditional television. In exemplary embodiments the primary content 101 may include other types of interactive TV content including, but is not limited to, pay-per-view video content, interactive games, advertisements, or the like. It is also contemplated that the display 100 may include various types of display devices including, but not limited to, a CRT display device, a plasma display device, an LCD display device, a DLP display device, a electroluminescence display device, or the like.

Figure 1C:
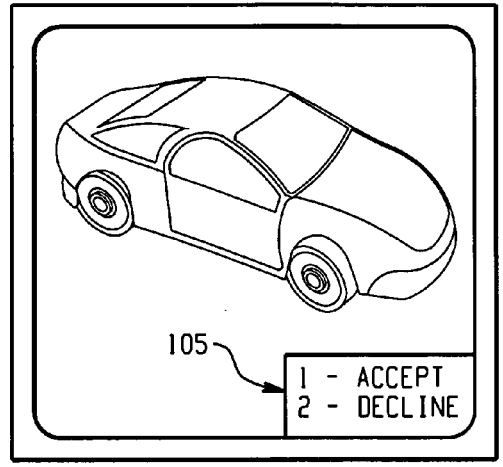
Figure 1B:
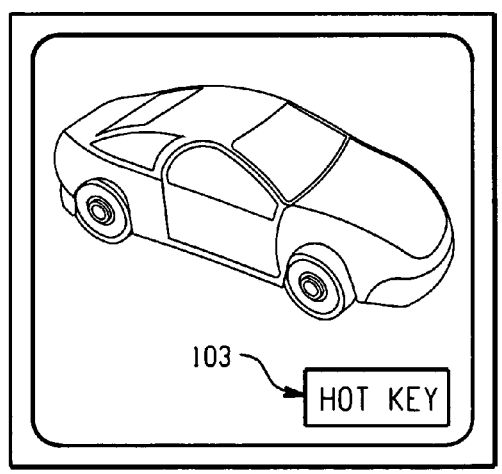

FIG. 1B illustrates receiving a hot key in accordance with exemplary embodiments. In exemplary embodiments, the user is tuned to the primary content 101 on the display 100 as in the shown in FIG. 1A. An indicator 103 is used to indicate to the user that a hot key has been received. A hot key is a soft key that is displayed that presents the user with an option to execute a activity, the activity may be indicated by the hot key. The hot key indicates that alternate content is available for the user's consumption. In exemplary embodiments, the alternate content may be in the form of another video program with content related to the primary content 101 being viewed by the user. In other exemplary embodiments, the alternate content may be an interactive user interface, such as a website related to the primary content 101 being viewed by the user. For example, the primary content 101 may be a commercial for a product and the alternate content may be a website where the user is able to purchase the advertised product. The indicator 103 may include, but is not limited to, an on-screen icon or an auditory alert.

FIG. 1C illustrates accepting a hot key in accordance with exemplary embodiments. The user is tuned to the primary content 101 as shown in FIGS. 1A and 1B and the indicator 103 is displayed to indicate to the user that a hot key has been received. Additionally, the indicator 103 may also indicate a manner in which the user may accept or decline the alternate content. In exemplary embodiments, the indicator 103 indicates that the user may press 1 to accept the alternate content or 2 to decline the alternate content. It will be appreciated by those of ordinary skill in the art that various other methods of accepting or declining the alternate content may be used. For example, a single or even multiple buttons on a remote control may be pressed by the user to accept or decline the alternate content. In exemplary embodiments, a single "hot key button" may be present on the user's remote control that may be pressed by the user whenever a hot key indicator is present on the television display. Pressing the hot key button may be a manner in which the user accepts the alternate content and is redirected to that content without further interaction from the user. In other exemplary embodiments, the user may decline the alternate content by taking no action at all. That is, after some time period during which no action is taken by the user to accept the alternate content, the hot key may simply time out and expire. Further methods of accepting or declining the alternate content may also be used.

Figure 1D:
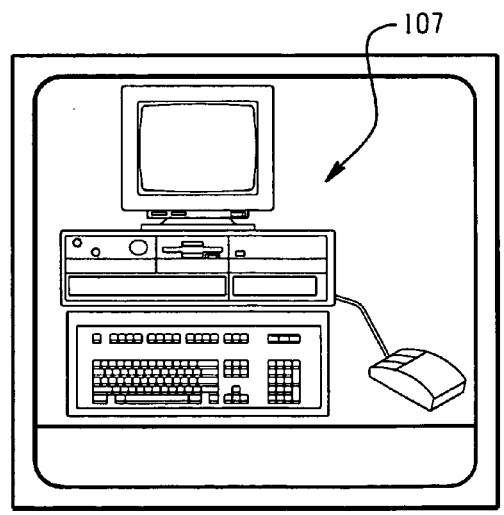

Regardless of the method used to accept the alternate content, FIG. 1D illustrates redirecting a user to the alternate content responsive to the hot key being accepted in accordance with exemplary embodiments. In exemplary embodiments, the alternate content may be an interactive user interface 107 with content related to the primary content 101 being viewed by the user. The display 100 in FIG. 1D illustrates the interactive user interface 107 being displayed. In other exemplary embodiments, the interactive user interface 107 may be a phone call. For example, the primary content 101 may be a commercial advertising a product and the alternate content may be a phone call to a customer service representative that will complete an order for the advertised product.

Figure 2:
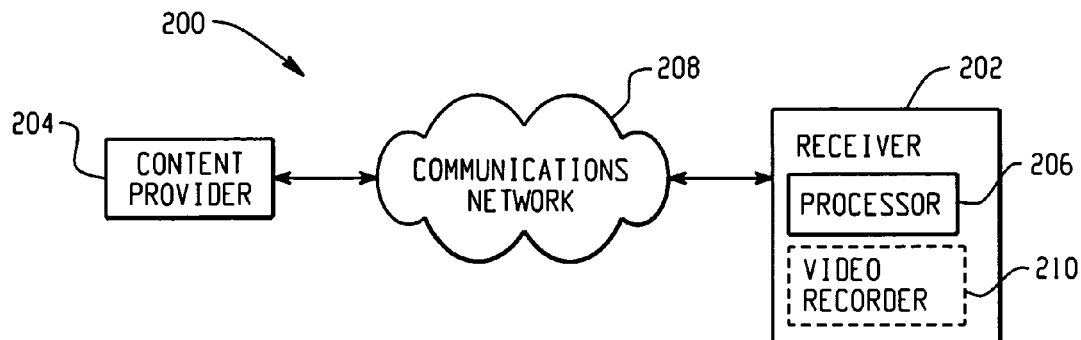
FIG. 2 illustrates a block diagram of a system for providing interactive advertisements in exemplary embodiments.

Turning now to FIG. 2, a block diagram of a system for providing interactive content in exemplary embodiments is depicted generally as 200. The system 200 for providing interactive content includes a receiver 202, a content provider 204, and a communications network 208. The receiver 202 receives a hot key signal related to content, e.g., an advertisement, from the content provider 204. The hot key signal is provided to the receiver 202 via the communications network 208. In exemplary embodiments, the hot key signal is indicative of an availability and a location of an alternate content. More specifically, the hot key signal may include an Internet Protocol (IP) data packet, the IP data packet having a header portion and a body portion, the body portion having a data field indicating a location for the alternate content.

In exemplary embodiments, a processor 206, which may be included in the receiver 202, determines whether the hot key signal is relevant to the user based on whether the alternate content is related to content currently being viewed by the user and responsively displays an on screen indication that the receiver 202 has received the hot key signal. Additionally, the processor 206, responsive to receiving an indication that the hot key has been selected by a user, redirects the user to the alternate content. The alternate content is an interactive user interface that may include, but is not limited to, a web site or phone call that allows the user to make a purchase relating to the advertisement. As depicted, the processor 206 may be located in the receiver 202, however, it is understood that the processor 206 may be a discrete component in operable communication with the receiver 202 and the content provider 204. In exemplary embodiments, the system for providing interactive content 200 may also include a video recorder 210 incorporated within or in operable communication with the receiver 202.

The content provider 204 may be any of a wide range of external sources including, but not limited to, a cable television provider, a digital satellite system provider, a traditional analog television provider, a digital cable provider, a digital broadcast provider, a video cassette, a digital video disk, or the like. Another possible content provider 204 is an Internet service provider, which provides data, video and/or audio via the Internet. It will also be appreciated that the primary and the alternate content can be provided to the receiver 202 using any of a wide range of conventional mediums, including both wireless (e.g., radio frequency) and wired (e.g., cable), and can be received directly (e.g., using a satellite dish), or indirectly (e.g., via a network such as the internet or a local area network). Furthermore, the primary and alternate content may be provided though a single or from multiple content providers 204.

Figure 3:
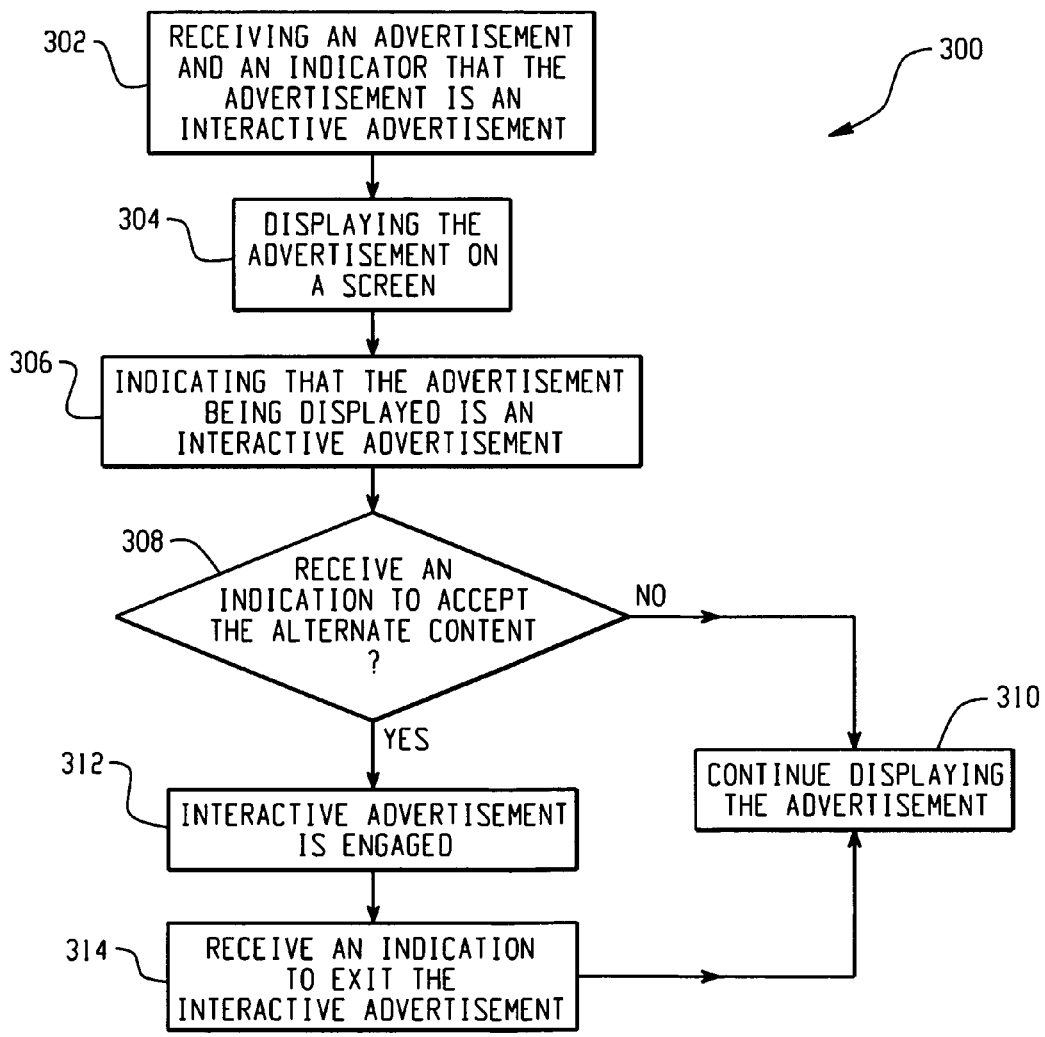
FIG. 3 illustrates a flow chart of a method for providing interactive advertisements in exemplary embodiments.

Turning now to FIG. 3, a flow chart of a method for providing interactive advertisements in accordance with exemplary embodiments is depicted generally as 300. As shown at process block 302, the method 300 for providing interactive content, e.g., advertisements includes receiving, e.g., an advertisement, or primary content, and an indicator that the advertisement is an interactive advertisement from a content provider. The method 300 for providing interactive advertisements also includes displaying the advisement on a display, as shown at process block 304. Further the method 300 for providing interactive advertisements includes indicating that the advertisement being displayed is an interactive advertisement, as shown at step 306. In exemplary embodiments, the indicator that the advertisement being displayed is an interactive advertisement can include, but is not limited to, a hot key, a light on the receiver, or an auditory alert. As shown at process block 308, if an indication is received from a user to engage the interactive advertisement the process proceed to process step 312. Upon either receiving an indication to not engage the interactive advertisement or upon the lapse of a predetermined period of time from the indicating that the advertisement being displayed is an interactive advertisement, the method 300 for providing interactive advertisements proceeds to step 310.

Continuing with reference to FIG. 3, after receiving an indication from a user to engage the interactive advertisement the method for providing interactive advertisements proceeds to process step 312. At process step 312, the interactive advertisement, or alternate content, is engaged. In exemplary embodiments, the interactive advertisement may include an interactive user interface, such as a website, instant messaging chat, voice chat, or the like. The interactive user interface may allow the user to retrieve additional information regarding the advertised product or service and may also allow the user to purchase the advertised product or service. At process step 314, the method for providing interactive advertisements 300 receives an indication that the user wishes to return to the primary content. For example, the use may have finished purchasing the product or service or decided not to make a purchase and select an option to exit the interactive user interface. The method for providing interactive advertisements 300 then returns to the advertisement, or primary content, as shown at step 310.

In an exemplary interactive television system, the television viewer is able to interact with the television broadcasting system by participating in polls, playing along with game shows, or purchasing goods and services from advertisers. In certain situations, the responses provided by the viewer may disrupt the viewer's enjoyment of the television program. For example, the viewer of a television program may desire to purchase a product advertised in a commercial. The viewer requests to purchase the product by pressing an appropriate button on a remote control device or on the interactive television device. In response to the viewer's request, the content provider may request information from the viewer, such as name, address, email address, telephone number, and the desired method of payment. While the viewer is providing the requested information (e.g., by typing or otherwise entering data into the interactive television system), the commercial may end and the broadcasting system resumes broadcasting the primary content such as a television program. At this point, the viewer must either continue entering data and miss a portion of the television program or abandon the request to purchase the product from the advertiser and continue watching the television program.

Figure 4:
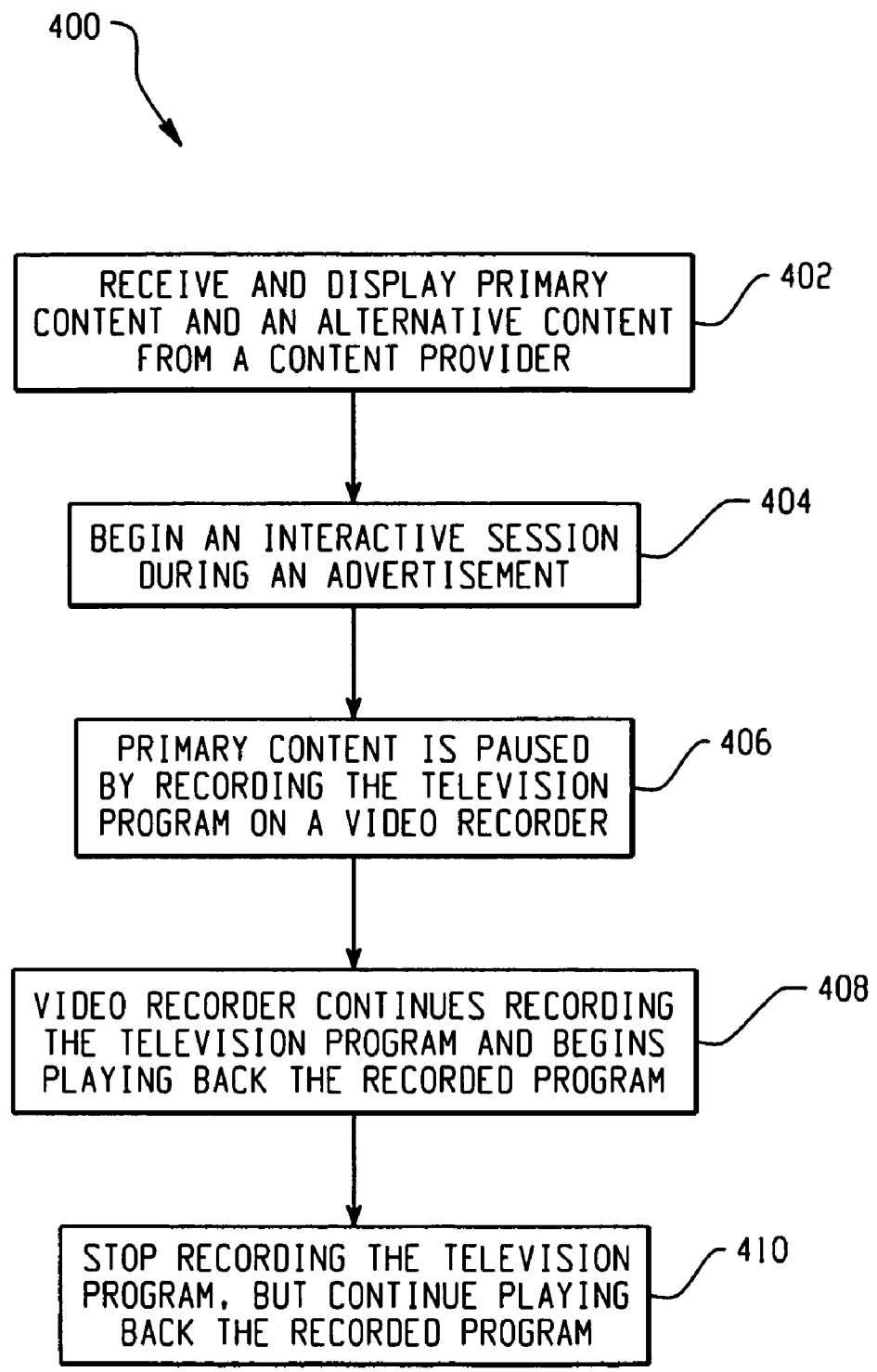
FIG. 4 illustrates a flow chart of a method for providing interactive advertisements including pausing a primary content in accordance with exemplary embodiments.

FIG. 4 is a flow diagram illustrating a method for providing an interactive advertisement including pausing the primary content in exemplary embodiments. A receiver receives and displays primary content and an alternate content from a content provider as shown at process block 402. During the broadcast of an advertisement, or alternate content, such as interactive session is offered to the viewer. For example, this interactive session may provide an opportunity for the viewer to purchase an advertised product or service. An interactive session allows the television viewer to provide data to a content provider or another source. In exemplary embodiment, separate communication links may be used to support the interactive session, e.g. an upstream link and a downstream link. A first communication link allows the viewer to receive information from the content provider. A second communication link (e.g. a data communication network) allows the viewer to transmit information to the content provider or some other data recipient.

Continuing with reference to FIG. 4, the viewer begins an interactive session during an advertisement as shown at process block 404. If the interactive session is still in progress when the advertisement is finished, then the primary content is paused by recording the television program on a video recorder, as shown at process block 408. In exemplary embodiments, the video recorder is a Digital Video Recorder (DVR) or similar device that can read from and write to any portion of a memory in a random manner. If the interactive session is complete when the advertisement is finished, then the television program is displayed without any pause.

When the interactive session is either completed or terminated by the user, the video recorder continues recording the television program and begins playing back the recorded program, as shown at process block 410. At the end of the television program, the video recorder may stop recording the television program, but continue playing back the recorded program, as shown at process block 412. Optionally, when playback of the recorded program is completed, the recorded program may be saved on the video recorder for later viewing or erased to release storage space on the video recorder.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention.

What is claimed is:

1. A system for providing interactive content, the system comprising:
    an input to receive a hot key signal, the hot key signal indicating an availability and a location of alternate content; and
    a processor to:
        send primary content to a display device;
        initiate sending an advertisement that temporarily interrupts at least a portion of the primary content to the display device, wherein the advertisement includes a hot key indicator responsive to the hot key signal, wherein the hot key indicator obscures at least a portion of the primary content, wherein the hot key signal comprises an Internet Protocol data packet, the Internet Protocol data packet having a header portion and a body portion, the body portion having a data field indicating the location of the alternate content, initiate an interactive session to enable access to the alternate content responsive to receiving an indication that the hot key signal is accepted, wherein the alternate content is related to the primary content, wherein the interactive session replaces the advertisement that is displayed at the display device, and wherein the interactive session enables a user to initiate an instant messaging session;

when the interactive session is completed before the advertisement has finished, automatically resume sending the primary content to the display device after the advertisement has finished; and when the interactive session is not completed before the advertisement has finished, automatically record the primary content until the advertisement has finished and send the recorded primary content to the display device after the advertisement has finished.

2. The system of claim 1, wherein the primary content is an advertisement and the alternate content includes additional information about a product advertised via the primary content.

3. The system of claim 2, wherein the interactive session includes an option to initiate a phone call with a customer service representative.

4. The system of claim 1, wherein the processor determines whether the hot key signal is relevant based on whether the alternate content is related to the primary content being displayed when the hot key signal is received.

5. The system of claim 1, further comprising a digital video recorder that automatically records the primary content when the interactive session is not completed before the advertisement has finished.

6. The system of claim 5, wherein after playback of a recording of the primary content, the digital video recorder automatically erases the recording.

7. The system of claim 1, wherein the interactive session enables the user to play along with a game show.

8. A method for providing interactive content, the method comprising:

sending primary content to a display device for display;

receiving an advertisement that temporarily interrupts at least a portion of the primary content, the advertisement including a hot key signal related to the primary content, the hot key signal indicating availability of alternate content, wherein the hot key signal comprises an Internet Protocol data packet, the Internet Protocol data packet having a header portion and a body portion, the body portion having a data field indicating a location of the alternate content;

receiving a request for the alternate content;

initiating an interactive session to enable access to the alternate content via an alternate content source in response to the request, wherein the interactive session replaces the advertisement that is displayed at the display device, and wherein the interactive session enables a user to initiate an instant messaging session;

when the interactive session is completed before the advertisement has finished, automatically resuming sending the primary content to the display device after the advertisement has finished; and when the interactive session is not completed before the advertisement has finished, automatically recording the primary content until the advertisement has finished and sending the recorded primary content to the display device after the advertisement has finished.

9. The method of claim 8, wherein the alternate content includes a link to enable access to a website and the interactive session enables the user to make a purchase related to the advertisement.

10. The method of claim 8, wherein the interactive session includes initiating a phone call to a customer service representative to place an order related to the advertisement.

11. A method, comprising:

receiving primary content at a receiver device;

sending the primary content from the receiver device to a display device that is coupled to the receiver device;

receiving advertising content that temporarily interrupts display of at least a portion of the primary content at the receiver device;

sending the advertising content to the display device from the receiver device;

receiving a hot key signal at the receiver device, the hot key signal including information to access additional content, wherein the hot key signal comprises an Internet Protocol data packet, the Internet Protocol data packet having a header portion and a body portion, the body portion having a data field indicating a location of the additional content;

sending a hot key indicator to the display device for presentation concurrently with the advertising content, the hot key indicator including instructions to access the additional content and instructions to dismiss the hot key indicator;

initiating an interactive session to enable access to the additional content in response to determining that the hot key indicator is accepted, wherein the interactive session replaces the advertising content that is displayed at the display device, and wherein the interactive session enables a user to initiate an instant messaging session;

when the interactive session is completed before the advertising content has finished, automatically resuming sending the primary content to the display device after the advertising content has finished; and when the interactive session is not completed before the advertising content has finished, automatically recording the primary content until the advertising content has finished and sending the recorded primary content to the display device after the advertising content has finished.

12. The method of claim 11, further comprising determining at the receiver device whether the additional content is related to the advertising content, wherein the hot key indicator is sent to the display device when the additional content is related to the advertising content, and wherein the hot key indicator is not sent to the display device when the additional content is not related to the advertising content.

13. The method of claim 11, further comprising ceasing to display the hot key indicator at the display device and continuing to display the advertising content in response to determining that the hot key indicator is dismissed.

14. The method of claim 11, further comprising:

displaying the hot key indicator for a predetermined period of time; and when no user input related to the hot key indicator is received at the receiver device during the predetermined period of time after the hot key indicator is sent to the display device, ceasing to display the hot key indicator and continuing to display the advertising content.

15. The method of claim 11, wherein the hot key indicator includes an auditory alert.

* * * * *